United States Patent [19]

Howell et al.

[11] 3,980,860

[45] Sept. 14, 1976

[54] FUME EXTRACTING TORCH HANDLE

[75] Inventors: Donald L. Howell, West Milton; Leo E. Wildenthaler, Troy, both of Ohio

[73] Assignee: Hobart Brothers Company, Troy, Ohio

[22] Filed: Feb. 19, 1974

[21] Appl. No.: 443,906

Related U.S. Application Data

[63] Continuation of Ser. No. 195,568, Nov. 4, 1971, abandoned.

[52] U.S. Cl. .................................. 219/130; 219/74; 219/136

[51] Int. Cl.$^2$ .................................. B23K 9/00

[58] Field of Search .................................. 219/74, 130, 136

[56] References Cited

UNITED STATES PATENTS

| | | | |
|---|---|---|---|
| 2,995,647 | 8/1961 | Bernard | 219/130 |
| 3,798,409 | 3/1974 | Troyer et al. | 219/130 |
| 3,886,344 | 5/1975 | Frantzreb, Sr. et al. | 219/130 |

FOREIGN PATENTS OR APPLICATIONS

| | | | |
|---|---|---|---|
| 234,557 | 10/1969 | U.S.S.R. | 219/230 |

OTHER PUBLICATIONS

Arthur A. Bernard and Richard A. Bernard "Fume-- Collecting Welding Guns", *Welding Engineer*, 10/1970, pp. 43–44.

*Primary Examiner*—J. V. Truhe
*Assistant Examiner*—Clifford C. Shaw
*Attorney, Agent, or Firm*—Biebel, French & Nauman

[57] ABSTRACT

A torch handle for use with a nozzle which includes a fume extracting orifice to remove fumes generated by welding or cutting includes a conduit within the handle for carrying the fumes to a vacuum pump and means for cooling the handle. In one embodiment, cooling is provided by mixing large quantitites of ambient air with the fumes in the vicinity of the nozzle. In another embodiment of the invention, ambient air is drawn into the handle and over the fume conduit and thereafter mixed with the fumes in the pipe leading to the vacuum pump. In a third embodiment, compressed air is directed into the handle from an internal source and passed over the fume carrying conduit within the handle. In a fourth embodiment, cooling water is passed over the surface of the fume extracting conduit within the handle.

1 Claim, 17 Drawing Figures

*INVENTORS*

DONALD L. HOWELL &
LEO E. WILDENTHALER

*BY*

Marechal, Biebel, French & Bugg
*ATTORNEYS*

30
45
50
25
10
52
5
35
46
4
60
95
105
92
75
81
90
103
91
24
85
80
100
90°
15°
96
58
57
67
68
69
62
65
63
70
86
55
56
82
76

FUME EXTRACTING TORCH HANDLE

RELATED APPLICATION

This application is a continuation of application Ser. No. 195,568, filed Nov. 4, 1971, now abandoned.

BACKGROUND OF THE INVENTION

During welding or cutting, especially of metallic parts, gases and solid material are generated which not only tend to obstruct the operator's vision, but also tend to cause visual and respiratory discomfort. This is especally true when welding or cutting in confined areas, such as assembly lines in factories, where several such operations may be in progress simultaneously.

One difficulty encountered in prior art fume extracting torches is in the size and weight of the torch employing such a fume extracting device, and the fact that a large nozzle will interfere with the operator's view. Another difficulty is in the fact that the fume extracting passageway of prior art devices gets very hot due to the heat of the fumes drawn away from the weld. This heat causes the fume carrying conduits to deteriorate, and if these conduits are carried by the gun, then the gun handle becomes hot and uncomfortable to handle. If the fume extracting conduit is not carried in the handle, then the torch and associated cables and conduits become unwieldy and cumbersome. Another difficulty, especially where the torch is a welding gun, is in the interference of the fume extracting nozzle with any shielding gas which might be used.

There have been several prior art attempts to combine a fume extracting device with hand held torches. Examples of these prior art devices may be found in the following: FUME EXTRACTION WHEN WELDING ZINC-COATED STEELS by Gregory et al, American Industrial Hygiene Assocation Journal, March 1971; DEVELOPMENT OF SPECIAL WELDING-NOZZLE CONFIGURATION by Mischler et al, Battelle Memorial Institute, Sept. 30, 1962; EXHAUSTING OF WELDING FUMES by Liefkens and Tichelaar, from Philips Welding Reporter, 1969/3; MINIMIZING THE WELDING FUME DANGER by T. B. Jefferson, January/February 1971, issue of The Welding Distributor; LOW-VOLUME HIGH-VELOCITY EXHAUST by Lawrie et al; VENTILATION FOR WELDING by T. B. Jefferson, Welding Engineer, October 1970; FUME COLLECTING WELDING GUNS by Arthur A. Bernard, Welding Engineer, October 1970; and U.S. Pat. Nos. 2,310,164; 2,432,639; 2,826,667; 2,935,312; 2,960,591; 2,963,570; 3,025,387; 3,514,567; 3,584,180; and 3,596,049.

SUMMARY OF THE INVENTION

This invention relates to an improved hand held torch for welding or cutting including a nozzle designed to remove smoke and fumes in which a fume extracting conduit is carried within the torch handle.

In the preferred embodiments of the invention, a fume extracting conduit is formed as an integral part of the torch handle, and this conduit, along with the smoke and fumes carried thereby, are cooled sufficiently to prevent rapid deterioration of the conduit and heating of the handle to the extent that it will become uncomfortable to the operator. In one embodiment of the invention, the cooling means includes means for mixing sufficient ambient air with the welding fumes. This ambient air, in combination with the positioning of the smoke and fume extracting orifice on the nozzle but away from the area of the weld or cutting operation allows the temperature of the handle to be maintained within acceptable limits.

In another embodiment of the invention, compressed air is directed into the handle from an external source and passed over the fume carrying conduit. In a third embodiment of the invention, ambient air is drawn into the handle of the gun at a location remote from the fume extracting orifice, and is drawn over the fume conduit in the handle before being mixed with the fumes. In a fourth embodiment of the invention, cooling water is passed over the surface of the fume carrying conduit within the handle.

In all the above described embodiments of the invention, the torch handle and associated cables may be made of smaller and lighter material then used in prior art devices, and yet have a long life since the temperature of these materials is maintained within the handle. An easy to manipulate, hand held torch is provided.

Accordingly, it is an object of this invention to provide an improved hand held torch in which a smoke and fume extracting nozzle is employed to draw frumes from the area of a weld or cutting operation and in which a fume carrying conduit is formed as an integral part of the torch handle; and to provide an improved torch of the type described wherein means are provided to cool the handle of the torch so that the heat from the welding or cutting operation will not deteriorate the materials used in the gun and will not cause discomfort to the operator.

Other objects and advantages of the invention will be apparent from the following description, the accompanying drawings and the appended claims.

DESCRIPTION OF THE PREFERRED EMBODIMENTS

Figure 1:
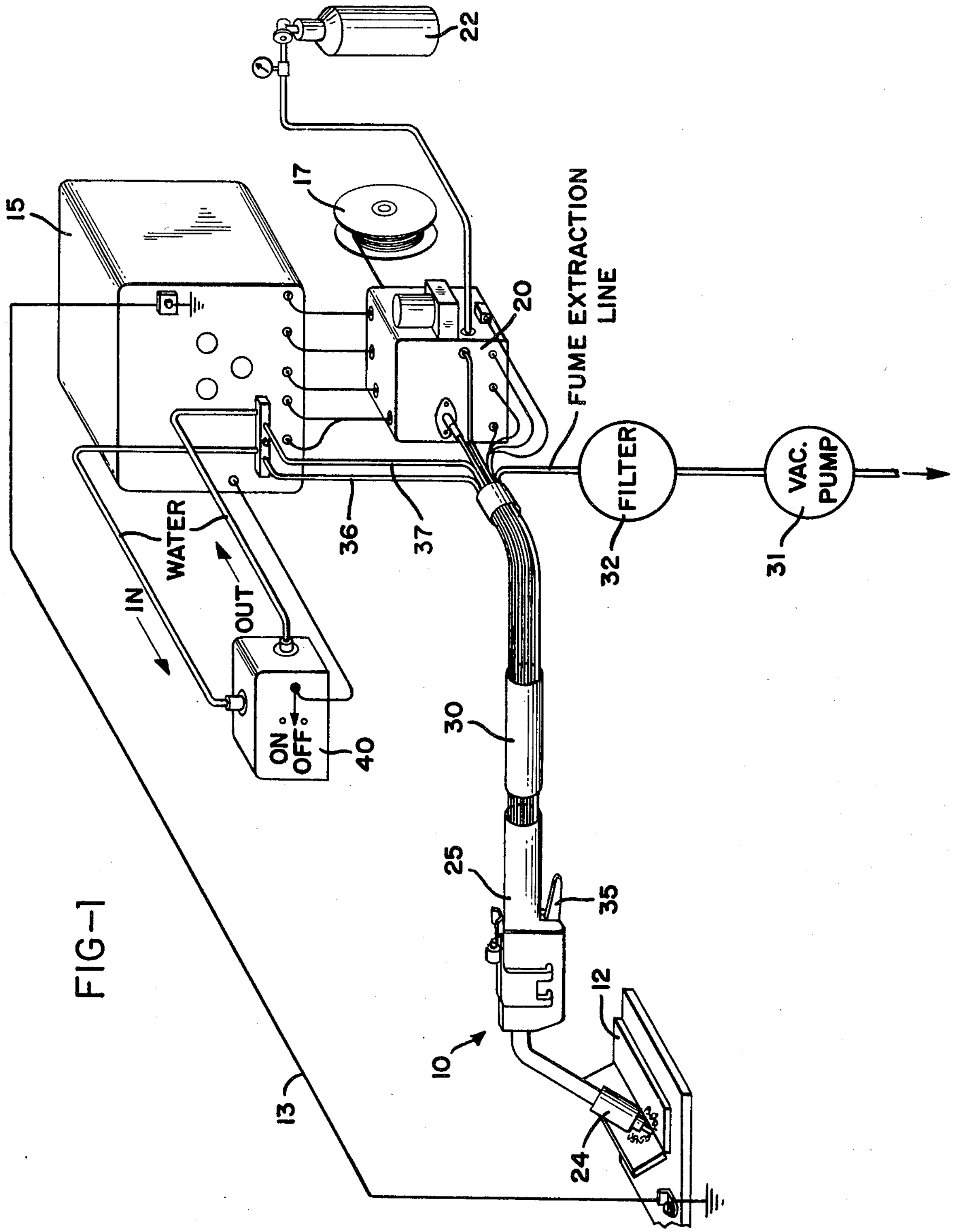
FIG. 1 is a schematic view of a welding torch, welding power supply, shielding gas source, fume extracting pump and filter, and one means of cooling a torch handle.

Reference is now made to the drawings which show the preferred embodiments of the invention, and particularly to FIG. 1 which is a schematic view of a welding system constructed according to this invention. While the invention will be described herein with reference to gas shielded welding guns or torches, it is to be understood that this invention also applies to MIG and TIG welding torches as well as to cutting torches.

A welding torch 10 is shown in position above a workpiece 12 which is connected by means of a ground wire 13 to a welding power supply 15. The welding torch 10 is supplied with wire from a wire supply reel 17 through a control system 20. This control system not only regulates the rate at which the welding wire moves into the torch, but it also regulates the flow of shielding gas from a gas source 22.

The welding torch 10 includes nozzle 24 having a fume extracting orifice connected to a passageway carried through the torch handle 25 and supply cable 30 to a vacuum pump 31 through a filter 32. A switch 35 in the handle of the torch is also connected by wires running through the cable 30 to the control system 20.

Also carried by the cable 30 are pipes 36 and 37 through which cooling fluid may pass to cool the handle 25 of the torch. In the embodiment shown in FIG. 1, these pipes 36 and 37 carry water from a water source 40 to lower the temperature of the torch handle. As will be explained, however, other means for cooling the torch handle may be employed within the scope of this invention.

The handle 25 of the torch is of small size, and since only a single cable 30 is used which carries all of the necessary cooling, control, power supply, and wire feeding conduits, a welding system is thereby provided which is convenient and easy to use and not unwieldy or cumbersome.

Figures 2, 3, 4, 5:
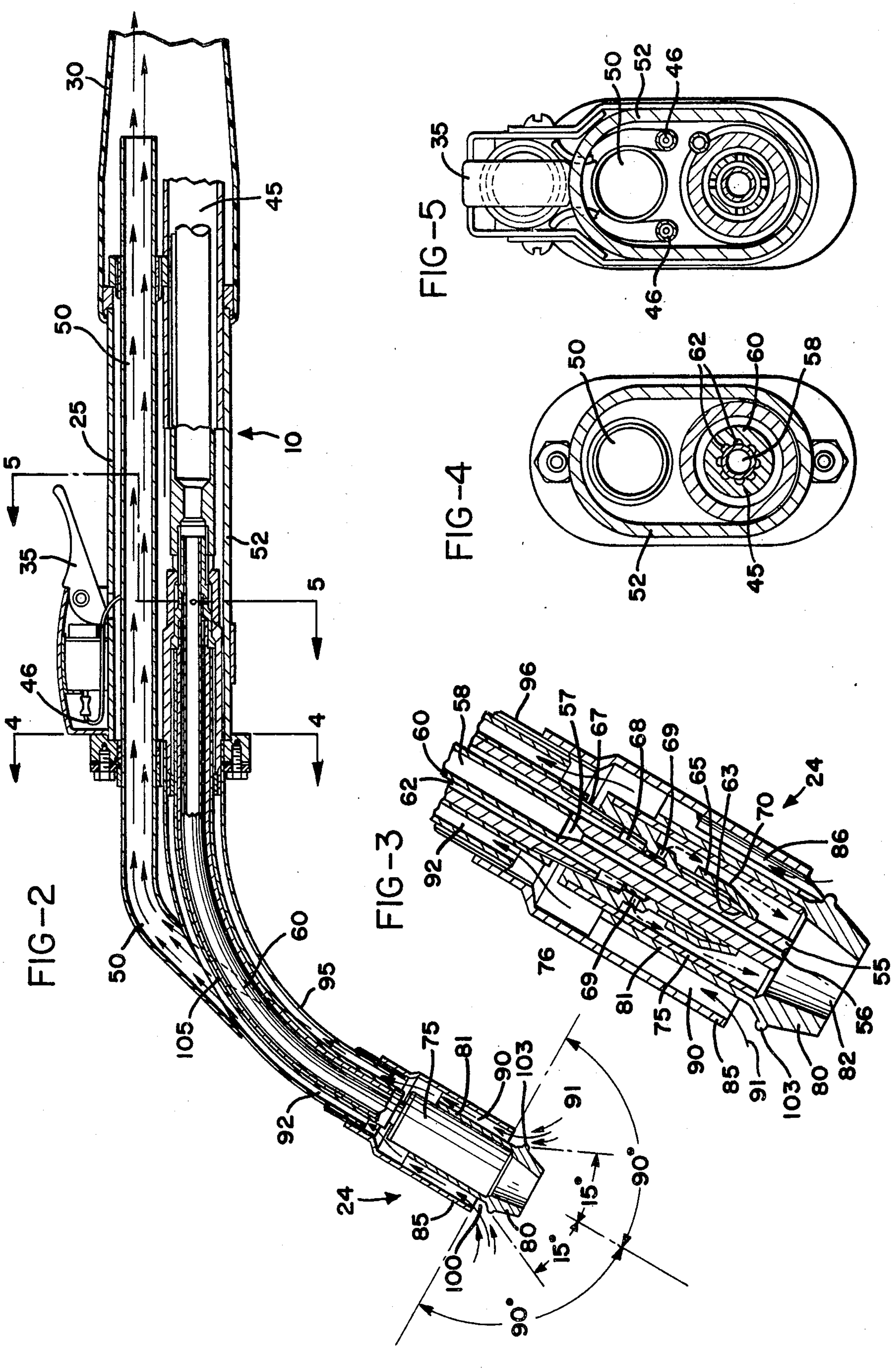
FIG. 2 is an elevational view, partly in cross section, of one embodiment of the invention wherein ambient air is mixed with the fumes drawn in by a welding torch nozzle to cause cooling thereof.
FIG. 3 is an enlarged view of a welding gun nozzle shown in FIG. 2.
FIG. 4 is a cross sectional view taken alonng line 4—4 of FIG. 2.
FIG. 5 is a cross sectional view taken along line 5—5 of FIG. 2.
Figure 6:
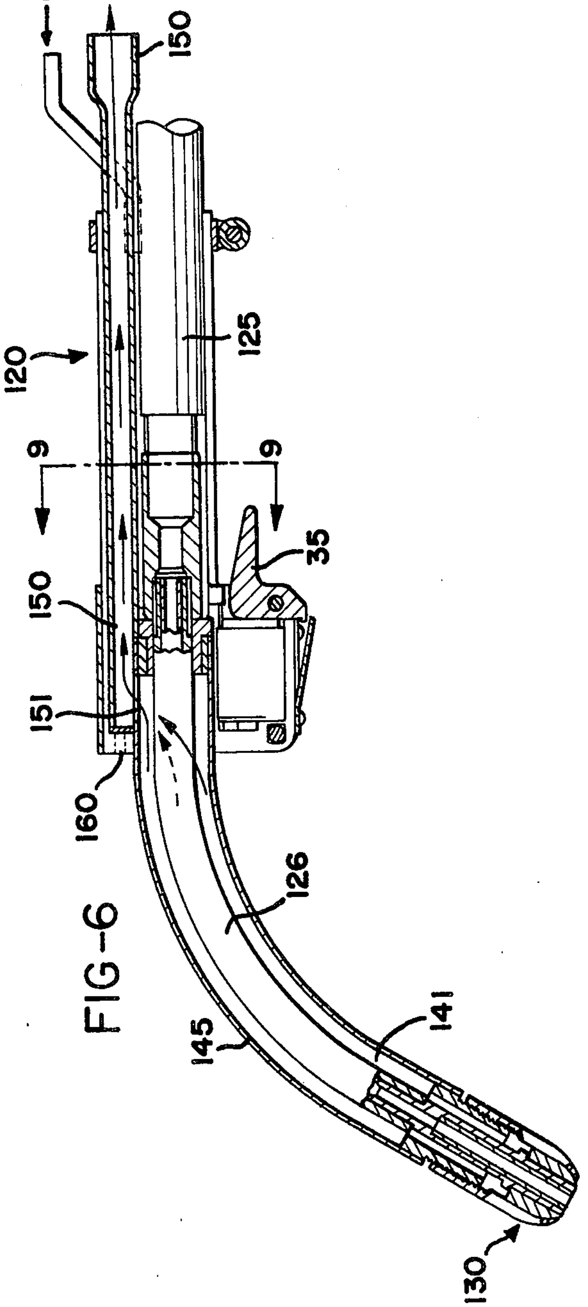
FIG. 6 is an elevational view, partly in cross section, of another embodiment of the invention wherein compressed air is directed over the fume extracting conduit in the handle to cause cooling thereof.

Referring now to FIG. 2 which illustrates one embodiment of the invention, the welding torch 10 includes a handle 25 including an inner conduit 45 through which shielding gas and welding wire are supplied. This conduit may also carry electrical control wires 46 to a handle mounted switch 35. The handle 25 also carries a fume conduit 50 through which the fumes removed from the area of the weld are directed as they are drawn through the handle by the vacuum pump 31. Both the inner conduit 45 and the fume conduit 50 are surrounded by an outer casing 52.

The nozzle 24, shown in detail in FIG. 3, includes a contact tip 55 having formed therein a passageway 56 through which welding wire is directed into the weld. At the upper end 57 of the contact tip the passageway opens up so that it has substantially the same diameter as the passageway 58 in wire guide tube 60. The wire guide tube 60 also includes a plurality of gas passageways 62 through which shielding gas may be directed into the weld. The contact tip 55 supplies substantially all of the electrical energy to the wire so that there will be practically no resistance heating of the welding wire prior to its exiting the lower end of the contact tip.

The contact tip 55 is received into and extends through a tapered opening 63 formed in a tip holder 65. The contact ttip is also tapered, and the outer surface of the contact tip and the opening 63 form a good electrical contact so that electric current flowing through the inner conduit 45 will be carried to the welding wire. The tip holder 65 includes an internal thread which cooperates with an external thread 67 on the wire guide tube 60 to cause the contact tip to firmly and positively engage the end of this tube. Between the end of the wire tube 60 and the contact tip 65 formed a manifold 68 into which shielding gas from the passageways 62 may flow and then be directed through a plurality of openings 69 in the contact tip into a chamber 70 where the shielding gas is then directed over the weld.

The chamber 70 is formed between the contact tip 65 and an insulating cylinder 75. This cylinder has an inside diameter substantially equal to the outside diameter of the tip holder in the area identified at 76. A nozzle ring 80 has a cylindrical portion 81 with an inside diameter substantially equal the outside diameter of the insulating cylinder 75 thereby to form a gas tight seal therebetween. The lowermost end of the nozzle ring 80 includes an opening 82 which receives the shielding gas from the chamber 70 and directs it over the weld.

The nozzle ring 80 is connected to a second cylindrical member or outer shell 85 by means of three spacer rods 86. Thus the nozzle ring 80 is fully supported and yet is maintained in electrically insulated relation to the contact tip and tip holder so that the nozzle ring itself carries no electrical energy, thus permitting the ring to contact the work without causing an electrical arc to be generated.

The outer shell 85 together with the cylindrical portion 81 of the nozzle ring and the insulator cylinder 75 form a fume extracting passageway 90 into which the fumes generated by the weld may be drawn in the direction shown by the arrows 91. This fume passageway extends upwardly into a passageway 92 in the gun formed between the guide tube 60 and an exhaust jacket 95. The lowermost portion of the exhaust jacket 95 includes a threaded member 96 onto which the outer ring 85 is attached.

An orifice 100 is thus formed between the lower end of the outer shell 85 and the nozzle ring 80. The nozzle ring 80 also includes an annular ring 103 surrounding the nozzle ring which cooperates with the lowermost end of the outer shell 85 to cause the fumes to be directed into the fume chamber 90 at an angle substantially normal to the axis of the nozzle, or at an angle substantially different from the direction of flow of the shielding gas. By causing the fumes to be drawn into the chamber in this way, the effect on the shielding gas by the vacuum system which removes the fume from the area of the weld is minimized.

The fume chamber 92 is connected to the fume conduit 50 by means of an opening 105 located a substantial distance from the nozzle. As may be seen in FIG. 2, the wire guide tube 60 bends downwardly from the handle 25. The opening 105 is located in this bend, and therefore the entrance to the fume conduit 50 is substantially axially aligned with the passageway 92. This will result in a substantially equal pressure existing completely around the circumferential extent of the orifice 100 and will allow fumes to be drawn into the nozzle evenly from any location around the nozzle.

In the embodiment of the invention shown in FIG. 2, the size of the orifice 100, the passageways 90 and 92, and the fume conduit 50 are so designed that, in combination with the capacity of the vacuum pump 31, sufficient ambient air is drawn into and mixed with the hot fumes removed from the welding area that the torch handle 25 is maintained at a temperature below that which would cause rapid deterioration of the gun materials or discomfort to the operator. Also, the orifice 100 is so located axially on the nozzle that the fumes must travel upwardly and away from the weld and are therefore cooled somewhat prior to entering the orifice 100. This combination therefore allows a welding gun to be constructed of a size which is convenient to use, since only one cable 30 is attached thereto, and which provides for the removal of smoke and fumes from the area of the weld.

Referring now to FIGS. 6–9 which illustrate another embodiment of the invention wherein compressed air is used to cool the torch handle, the welding torch handle 120 includes an inner conduit 125 for supplying electrical current and welding wire to the weld. This inner conduit may be removably attached to a wire guide tube 126 within the handle. In the embodiment shown in FIG. 6, the welding torch is not shown with means for supplying shielding gas to the weld, although it will be understood by those skilled in the art that shielding gas could be provided if desired.

A nozzle 130 is connected to the wire guide tube 126 and includes a passageway 131 through which the welding wire is fed. The nozzle also includes a contact tip 132 to engage the wire and to supply the electrical current used in the welding process. The nozzle 130 also includes a fume passageway 135 concentric with the guide tube and in communication with an orifice 140 extending circumferentially around the nozzle to draw into the nozzle fumes which result from the weld. Since shielding gas is not used in this embodidment, it is not necessary to insure that the flow of the fumes into the nozzle does not interfere with the flow of shielding gas, and therefore a nozzle smaller than that shown in FIG. 3 may be constructed.

The fume passageway 135 within the nozzle communicates with a passageway 141 in the neck of the gun formed between the wire guide tube 126 and an exhaust jacket 145. Within the handle, the passageway 141 communicates with a fume conduit 150 through an opening 151 formed in the exhaust jacket.

Figure 9:
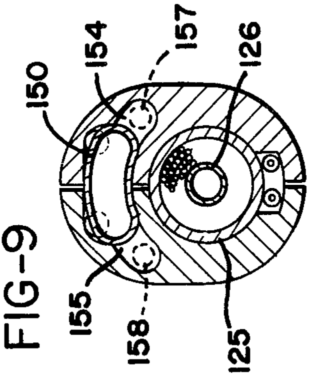
FIG. 9 is a cross sectional view taken along line 9—9 in FIG. 6.
Figure 8:
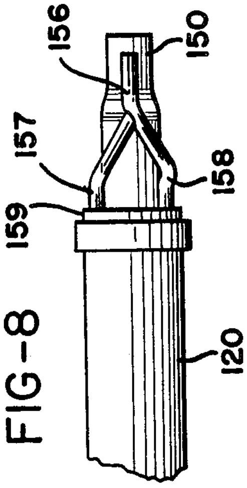
FIG. 8 is a plan view of a portion of the handle shown in FIG. 6.
Figure 7:
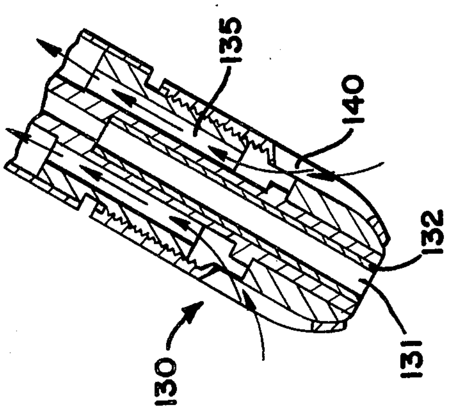
FIG. 7 is an enlarged view of the nozzle used with the gun of FIG. 6.

The cooling of the handle 120, and especially the fume conduit 150 within the handle, is provided by directing compressed air into chambers 154 and 155. As shown in FIG. 9, these chambers include a large portion of the fume conduit and provide sufficient heat exchange area to cool the gun. Compressed air is carried by line 156 within the cable 30. This line is divided into two inlet lines 157 and 158 in the handle, and are terminated in an end plate 159. The compressed air is vented through an outlet port 160 at the forward end of the handle 120.

Figures 10, 11, 12, 13, 14, 15:
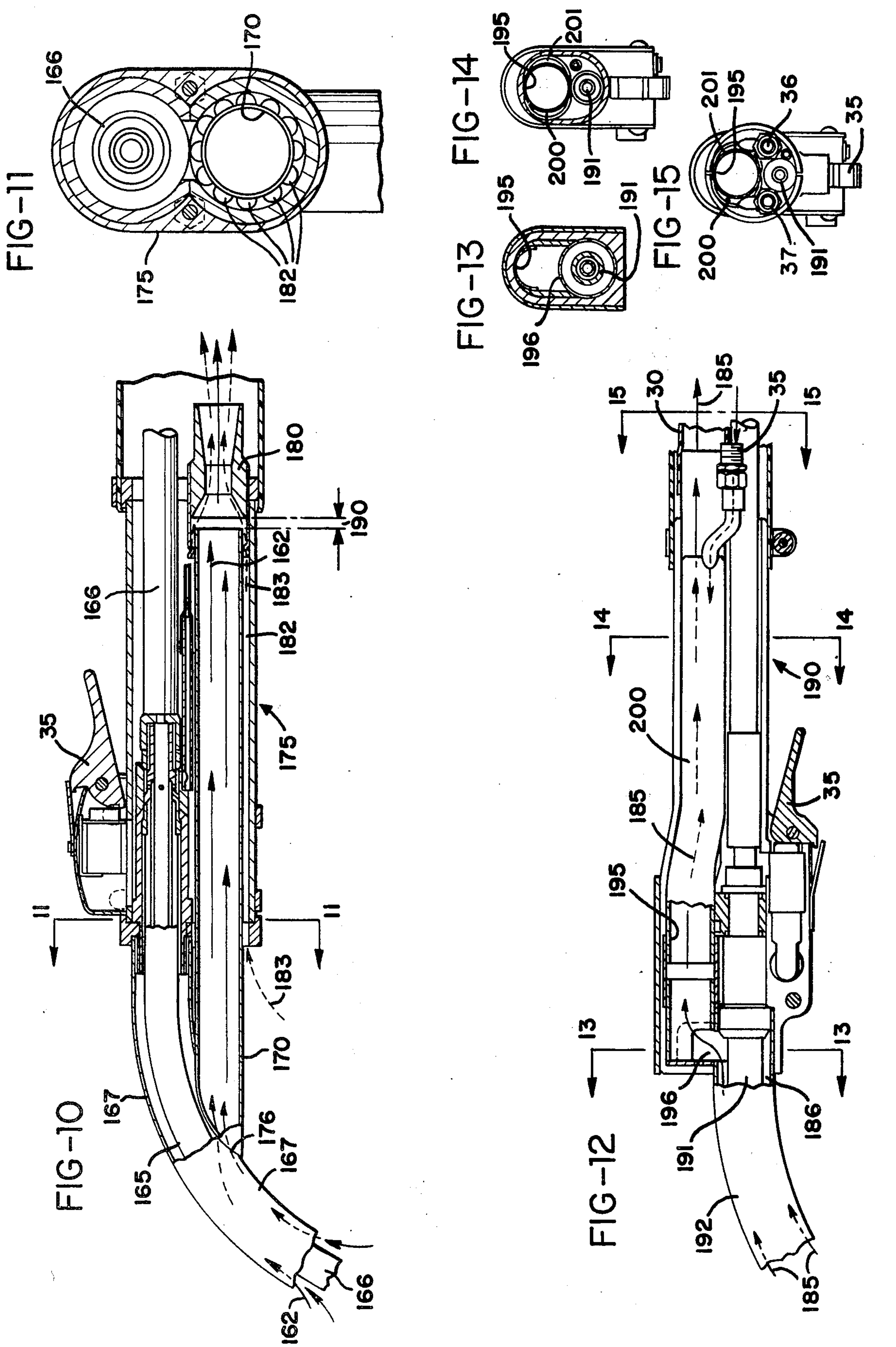
FIG. 10 is an elevational view, partly in cross section, of another embodiment of the invention wherein the handle is cooled by additional ambient air drawn into and around the fume extracting conduit in the handle.
FIG. 11 is a cross sectional view taken along line 11—11 of FIG. 10.
FIG. 12 is an elevational view of still another embodiment of the invention wherein cooling water is directed into the handle to surround and cool the fume extracting conduit within the handle.
FIG. 13 is a cross sectional view taken along line 13—13 in FIG. 12.
FIG. 14 is a cross sectional view taken along line 14—14 in FIG. 12.
FIG. 15 is a cross sectional view taken along line 15—15 in FIG. 12.

Another embodiment of the invention is shown in FIGS. 10 and 11. In this embodiment, additional ambient air is drawn into the welding torch handle and flows around the fume conduit within the handle to provide cooling. A venturi is included in the handle to provide the necessary vacuum to draw in this additional amabient air.

Fumes and smoke from the weld are directed as shown by the arrows 162 into a fume passageway 165 formed between a guide tube 166 and an exhaust jacket 167. This passageway communicates with a fume conduit 170 in the gun handle 175 through an orifice 176 formed in the exhaust jacket. As in other embodiments of the invention, the guide tube 166 carries consumable welding wire, electrical current, and may also carry shielding gas.

The fume conduit 170 is connected at one end to a venturi 180 and the outlet of the venturi is connected to the vacuum pump 31 and filter 32. Surrounding the fume conduit within the handle are a plurality of cooling air passages 182 which allow ambient air represented by the arrow 183 to be drawn in, surround and cool the fume conduit 170. The ambient air 183 is mixed with the fumes 162 at the right end of the conduit 170. The space 190 which exists between the end of the fume conduit 170 and the venturi 180 is adjusted to control the amount of ambient air which is drawn into the passages 182 in the handle.

Still another embodiment of the invention is shown in FIGS. 12–15. In this embodiment, cooling water is supplied to cool the handle from the heat radiated by the fumes carried within the handle. Again, this type of handle may be used with either the gas shielded or nonshielded welding technique.

Exhaust fumes and smoke, represented by the arrows 185 are drawn into an appropriate nozzle, not shown, through a fume passageway 186 into a handle 190. The passageway 186, as in the other embodiments of the invention, may be formed between a wire guide tube 191 and an exhaust jacket 192. A fume conduit 195 within the handle 190 communicates with the exhaust passageway 186 through an opening 196 in the exhaust jacket 192. Surrounding the fume conduit within the area of the handle are water jackets 200 and 201. Water is supplied to the jacket 200 by means of a pipe 36, where it circulates around the conduit 195, and then the water is carried back around the conduit by jacket 201, and discharged by pipe 37 and returned to the source for cooling through the cable 30. In this embodiment, the welding torch may be made quite small since water is an effective means of cooling the handle.

Figures 16, 17:
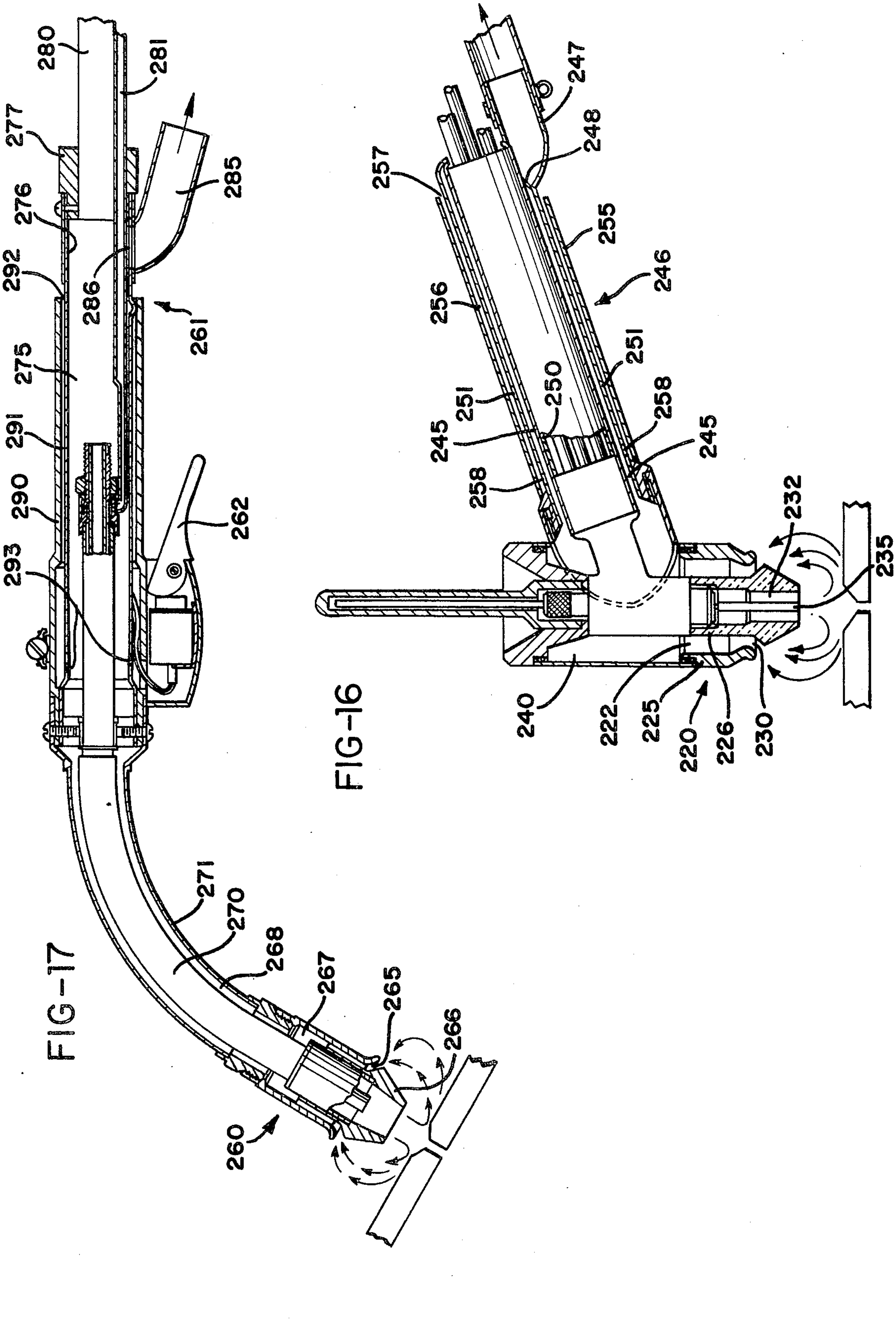
FIG. 16 is an elevational view, partly in cross section, of another embodiment of the invention wherein ambient air is drawn into the nozzle and also through the handle to a TIG welding torch to cause cooling thereof.
FIG. 17 is an elevational view, partly in cross section, of still another embodiment of the invention wherein ambient air is drawn into the nozzle and also into the handle to provide cooling.

A TIG welding torch is shown in FIG. 16 which includes a nozzle 220 provided with means for receiving smoke and fumes from the weld. This means includes a fume chamber 222 formed between an outer member 225 and a concentric inner member 226. An orifice 230 is formed between the lower end of the outer member and the inner member to receive smoke and fumes from an area a laterally outwardly from the nozzle and remote from the weld. The inner member 226 includes an axially arranged opening 232 through which shielding gas may flow and be directed to the weld. This opening also accommodates an electrode 235. For TIG welding the location of the orifice 230 is selected so that substantially no interference to the shielding gas results.

The fume chamber 222 is in communication with a larger chamber 240 of sufficient volume to insure that a substantially equal pressure exists throughout the circumferential extent of the orifice 230 and is connected to a fume passageway 245 in the handle 246 of the gun. The fume passageway 245 is concentric with the axis of the handle 246 and is connected to an exhaust conduit 247 through an opening 248 formed in the handle. The fume passageway 245 is formed by an inner conduit 250 which carries shielding gas and electrical current to the nozzle, and an intermediate, coaxially arranged shell 251.

Surrounding and coaxial with the intermediate shell 251 is an outer housing 255 which defines therebetween a cooling passageway 256 through which ambient air may flow. The cooling passageway 256 through which ambient air may flow. The cooling passageway 256 is open to the atmosphere at 257, and is in communication with the fume passageway 245 by means of a plurality of openings 258 formed in the intermediate shell 251 at the forward part of the handle.

Thus, the cooling passageway 256 is in thermal contact with the fume passageway 245 within the handle and separates the fume passageway from the outer housing 255. Ambient air drawn into the cooling passageway travels substantially the length of the handle to cool the outer housing and the fume passageway and thereafter the ambient air is drawn into and mixed with the smoke and fumes within the fume passageway.

Typical operating conditions are 300 to 500 amps welding current, 20 to 40 cubic feet per hour shielding gas, 20 to 40 cubic feet per minute total input of ambient air, smoke and fumes at the orifice 230, and 1 to 5 inches cubic feet per minute ambient air at the opening 257 in the handle. Under these conditions, the temperature of the outer housing 255 will be maintained at or below 120°FF.

Another embodiment is shown in FIG. 17 wherein a welding torch is shown including a nozzle 260 and a handle 261. An electric switch 262 mounted on the handle may be used by the operator to control the flow of shielding gas, electrical current, and the movement of welding wire.

The nozzle 260 is similar to that shown in FIG. 3 and includes a circumferentially extending orifice 265 spaced axially away from the end 266 of the nozzle. This orifice receives smoke and fumes from an area laterally outwardly from the nozzle and remote from the weld. Connected to the orifice is a fume chamber 267 through which smoke, fumes, ambient air and spent shielding gas may flow when a vacuum pump is connected to the torch. A fume passageway 268 formed between the inner conduit 270 and an outer shell 271 carries the smoke, fumes and ambient air from the fume chamber in the nozzle to the handle. As in other embodiments of the invention, the inner conduit 270 carries shielding gas, electrical current and welding wire.

Within the handle 261, smoke and fumes are carried by a fume passageway 275 contained within an inner shell 276. This shell is sealed at 277 at the point where the cables 280 and 281 enter the handle. The fume passageway 275 is connected to an exhaust conduit 285 through an opening 286 formed in the shell 276. The location of the opening 286 is sufficiently remote from the orifice 265 that a substantially equal pressure drop exists throughout the circumferential extent of that orifice.

An outer housing 290 is coaxial with and surrounds the shell 276 and forms therebetween a cooling passageway 291 through which ambient air may be drawn into an opening 292 to flow across the outer surface of the shell 276. A plurality of openings 293 formed in the forward part of the handle allow ambient air to enter into and mix the fumes and smoke in the fume passageway 275.

Thus, the cooling passageway 291 separates the fume passageway from the outer housing 290, and since the cooling passageway is in thermal contact with the fume passageway, ambient air which travels substantially the length of the handle will cool the handle. This ambient air is then drawn into the fume passageway and mixed with the smoke and fumes.

In the embodiment shown in FIG. 17, normal operating conditions including a welding current of 300 to 500 amps, a shielding gas flow of 40 cubic feet per hour, 25 to 40 cubic feet per minute total combination of ambient air, fumes, smoke and spent shielding gas into the orifice 265, and 1 to 5 cubic feet per minute ambient air at the opening 291 between the shell 276 and the outer housing 290. In the embodiment of FIG. 17, the maximum diameter of the orifice 265 is approximately one and one-half inches, and a 3/32 diameter flux cored electrode may be used with or without shielding gas. Under these conditions, the temperature of the outer housing 290 will not exceed 120°F.

Thus, an improved apparatus for cooling the handle of a torch carrying smoke and fumes at elevated temperatures has been described, with several species of the invention disclosed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A torch for use in welding operations during which smoke and/or fumes are created, said torch comprising
- a welding head having a longitudinal axis and an axial end adjacent which welding occurs,
- means defining a smoke and/or fume extraction opening in said head extending substantially entirely therearound and communicating with the exterior of the head for receiving said smoke and/or fumes,
- an annular ring on said head located rearwardly of said axial end and forwardly of said opening and extending radially outwardly to inhibit the direct flow of gas from the region of the weld and to cause smoke and/or fumes from the weld first to flow outwardly and then be drawn laterally inwardly into said opening,
- means defining a chamber within said head connected to said opening for receiving said smoke and/or fumes therefrom,
- a handle including a forward part connected to said head and a rearward part,
- an inner conduit extending through said handle and having one end thereof extending into said head,
- a shielding gas supply conduit within said inner conduit extending at least partially through said handle and having one end thereof extending through said head and provided with a discharge orifice adjacent said axial end of said head, an exhaust jacket extending from said head and surrounding said inner conduit to define therebetween a fume passageway in communication with said chamber within said head, said exhaust jacket and said inner conduit being concentric from said head through at least part of said handle, means for connecting a source of negative pressure to said fume passageway at the rearward part of said handle whereby air flow may be induced into said opening in said head, and means for cooling said exhaust jacket within said handle including a housing surrounding said exhaust jacket and means for directing air through the space between said housing and said exhaust jacket and means for exhausting said air to the exterior of said handle thereby to remove heat from said jacket and said handle.

* * * * *